(12) United States Patent
DiMatteo et al.

(10) Patent No.: US 7,340,966 B2
(45) Date of Patent: Mar. 11, 2008

(54) SENSOR WITH WATER INGRESS PROTECTION

(75) Inventors: Mark DiMatteo, Irwin, PA (US); Michael E. Mort, Somerset, PA (US); Michael Bobeck, Sarver, PA (US)

(73) Assignee: RIC Investments, LLC, Wilmington, DE (US)

( * ) Notice: Subject to any disclaimer, the term of this patent is extended or adjusted under 35 U.S.C. 154(b) by 0 days.

(21) Appl. No.: 11/210,532

(22) Filed: Aug. 24, 2005

(65) Prior Publication Data

US 2007/0051185 A1  Mar. 8, 2007

(51) Int. Cl.
*G01F 1/42* (2006.01)

(52) U.S. Cl. .................. 73/861.61; 137/39

(58) Field of Classification Search .......... 73/861.61
See application file for complete search history.

(56) References Cited

U.S. PATENT DOCUMENTS

| | | | | |
|---|---|---|---|---|
| 4,698,060 A | * | 10/1987 | D'Antonio et al. | 604/320 |
| 4,749,553 A | * | 6/1988 | Lopez et al. | 422/84 |
| 5,031,790 A | * | 7/1991 | Keller | 220/203.2 |
| 5,172,714 A | * | 12/1992 | Kobayashi et al. | 137/39 |
| 5,347,843 A | * | 9/1994 | Orr et al. | 73/1.34 |
| 5,823,228 A | * | 10/1998 | Chou | 137/597 |
| 5,868,159 A | * | 2/1999 | Loan et al. | 137/334 |
| 6,279,401 B1 | * | 8/2001 | Karas | 73/716 |
| 6,319,375 B1 | * | 11/2001 | Warburton | 204/409 |
| 6,915,705 B1 | | 7/2005 | Truitt et al. | |

* cited by examiner

*Primary Examiner*—Harshad Patel
(74) *Attorney, Agent, or Firm*—Michael W. Haas (57) ABSTRACT

A gas monitoring system that comprises a sensor, a first valve, and a second valve. The sensor is disposed within a sensor housing that has an inlet and an outlet. The sensor generates a signal based on a characteristic of a gas within the housing. The first valve is disposed at the inlet. The second valve is disposed at the outlet. The first valve and the second valve open and close based on an orientation of the sensor housing.

26 Claims, 5 Drawing Sheets

SENSOR WITH WATER INGRESS PROTECTION

BACKGROUND OF THE INVENTION

1. Field of the Invention

The invention relates generally to a sensor the monitors a characteristic of a fluid, and, in particular, to technique for protecting such a sensor from liquid ingress.

2. Description of the Related Art

Systems that implement a sensor in communication with a flow of fluid, such as a gas, to monitor a characteristic of the flow of gas are well known. For example, it is known to provide a flow or pressure sensor in communication with a flow path to monitor a flow rate or pressure of gas through the flow path. In such systems, when liquid is present in the flow path, and the liquid is introduced to a conventional sensor, the accuracy of the sensor may be impeded, both in the short term and in the long term. In fact, in some instances, the introduction of liquid to a typical flow sensor may degrade the accuracy of the flow sensor to a degree such that readings taken by the flow sensor of the flow rate may become unusable.

In a device that employs a pressure or flow sensor to monitor the pressure or flow rate of gas along a flow path, such as a ventilator or pressure support system that provides a pressurized flow of gas to a patient along a flow path, the accuracy of the pressure or flow sensor being used may be relatively important to the operation of the device. Further, such a device may include a supply of liquid that is in communication with the flow path being monitored by the pressure or flow sensor. For example, in a ventilator or pressure support system, a humidifier for elevating a humidity level of gas may hold a supply of liquid in communication with the flow path. During use, due to various reasons, such as movement of the device, liquid from the supply of liquid held by the humidification chamber may reach the flow path being monitored by the pressure or flow sensor, and may enter the pressure or flow sensor. In such devices there exists a need for a system that substantially prevents the liquid from being introduced into the pressure or flow sensor, in order to preserve the accuracy of the sensor.

BRIEF SUMMARY OF THE INVENTION

One aspect of the invention relates to a gas monitoring system that comprises a sensor, a first valve, and a second valve. The sensor is disposed within a sensor housing that has an inlet and an outlet. The sensor generates a signal based on a characteristic of a gas within the housing. The first valve is disposed at the inlet. The second valve is disposed at the outlet. The first valve and the second valve open and close based on an orientation of the sensor housing.

Another aspect of the invention relates to a gas monitoring system that comprises a conduit, a sensor, a first passage, a second passage, a first valve, and a second valve. The conduit is constructed and arranged to conduct a flow of gas therethrough. The sensor disposed within a sensor housing, the housing having an inlet and an outlet, the sensor generates a signal based on a characteristic of the gas within the sensor housing. The first passage communicates the conduit with the inlet such that a portion of the gas flowing through the conduit is communicated to the sensor. The second passage communicates the conduit with the outlet such that the gas received by the sensor is returned to the conduit by the second passage. The first valve is disposed at the inlet, and the second valve disposed at the outlet. The first valve selectively seals the inlet from the first passage and the second valve selectively seals the outlet valve from the second passage to inhibit liquid from reaching the sensor.

Another aspect of the invention relates to a device that comprises a tank, a sensor, and an inlet valve. The tank holds a reservoir of liquid. The sensor is provided within a sensor housing that has an inlet. The sensor generates a signal based on a characteristic of a gas within the sensor housing. The inlet valve is disposed at the inlet. When the device is tilted such that liquid from the reservoir of the liquid held by the tank travels toward the inlet of the sensor housing, the inlet valve closes to substantially prevent the liquid from reaching the sensor.

Another aspect of the invention relates to a gas monitoring system that comprises a conduit, a chamber, a sensor, and a valve. The conduit is constructed and arranged to conduct gas therethrough, and is adapted to be in communication with a liquid reservoir for adding humidity to the gas. The chamber is disposed exteriorly to the conduit, wherein a wall that separates the chamber from the conduit comprises an orifice that communicates a portion of the gas in the conduit to the chamber. The sensor communicates with the chamber to determine at least one characteristic of the gas. The valve is disposed between the orifice and the sensor to inhibit the liquid from reaching the sensor.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise

DETAILED DESCRIPTION OF THE EXEMPLARY EMBODIMENTS

Figure 1:
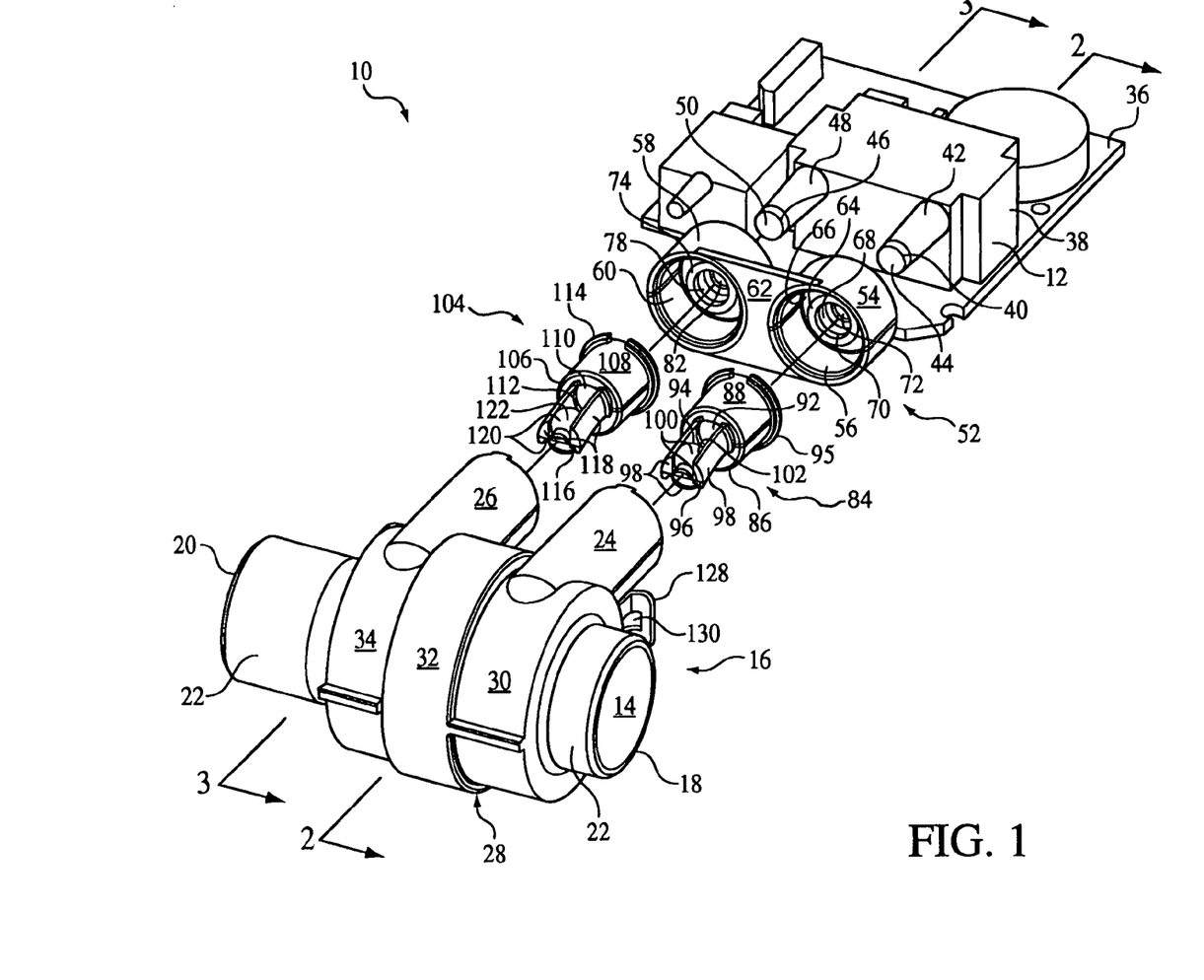
FIG. 1 is an exploded view of a flow monitoring system, according to one embodiment of the invention.

FIG. 1 is an exploded view of a flow monitoring system 10, according to one embodiment of the invention. Flow monitoring system 10 may be disposed within any system or setting where a flow of gas is monitored to determine a flow rate. For example, in one embodiment, flow monitoring system 10 is disposed in a pressure support system that provides a pressurized flow of breathable gas to a patient. Examples of pressure support systems in the flow monitoring system can be used include, but are not limited to: a ventilator, continuous positive airway pressure (CPAP) device, or a variable pressure device, e.g. an auto-titrating device, proportional assist ventilation (PAV®) device, proportional positive airway pressure (PPAP®) device, C-Flex™ device, Bi-Flex™ device, that varies the pressure based on the patient's effort or flow. Other examples of pressure support systems include a BiPAP® device manufactured and distributed by Respironics, Inc. of Pittsburgh, Pa., in which the pressure provided to the patient varies with the patient's respiratory cycle so that a higher pressure is delivered during inspiration than during expiration, or other pressure support device. It should be appreciated that numerous other applications also exist for the flow monitoring system of the present invention, such as room humidifiers, air conditioning systems, just for example.

Flow monitoring system 10 includes a flow sensor 12, and is adapted and configured to monitor, with flow sensor 12, a flow rate of gas along a flow path 14 formed by a flow element 16, from a flow inlet 18 to a flow outlet 20. Flow element 16 includes a flow conduit 22, a first valve chamber 24, a second valve chamber 26, and an annular housing 28. Annular housing 28 includes a first annular housing portion 30, a second annular housing portion 32, and a third annular housing portion 34.

FIG. 1 shows flow sensor 12 disposed on a circuit board 36. Flow sensor 12 is substantially encased by a flow sensor housing 38. A sensor inlet 40 is formed as a hollow protrusion 42 extending from flow sensor housing 38. An opening 44 in flow sensor housing 38 is formed at the distal end of hollow protrusion 42 to form the sensor inlet 40. A sensor outlet 46 is formed as a hollow protrusion 48 extending from flow sensor housing 38. At the distal end of hollow protrusion 48, an opening 50 is provided to form sensor outlet 46.

In FIG. 1, an adaptor member 52 is shown, including a first cup 54 that forms a first cavity 56 and a second cup 58 that forms a second cavity 60. First cup 54 and second cup 58 are connected by a bridge member 62. It can be appreciated, however, that bridge member 62 can be omitted or can have other configurations. A hollow protrusion 64 extends from a bottom surface of first cup 54, forming an annular groove 66 between an inner wall of first cup 54 and an outer surface of hollow protrusion 64. A cleat 68 extends radially inwardly into hollow protrusion 64. An opening 70 is formed at the distal end of hollow protrusion 64, while an opening 72 is formed in the bottom surface of first cup 54 coaxially with hollow protrusion 64, but with a smaller diameter than the inner diameter of hollow protrusion 64.

Similarly, a hollow protrusion 74 extends from a bottom surface of second cup 58, similar to hollow protrusion 64, and including a cleat 76, and an opening 78 that correspond to cleat 68 and opening 70 of hollow protrusion 64. An outer surface of hollow protrusion 74, in coordination with an inner wall of second cup 58, form an annular groove 80. An opening 82 is formed at the bottom surface of second cup 58 coaxially with hollow protrusion 74, but with a smaller diameter than the inner diameter of hollow protrusion 64. In one embodiment, adaptor member 52 is composed of a soft, pliable material such as, for example, silicon, rubber, or another pliable material.

In the embodiment illustrated in FIG. 1, flow monitoring system 10 includes a first valve 84, which is shown as a ball valve, that includes a valve body 86. Valve body 86 includes a valve conduit 88 that is formed as a hollow cylinder with an interface opening (not shown in FIG. 1; see interface opening 90 in FIG. 2) at one end, and a valve opening 92 at the other end. On the side of valve conduit 88, a conduit opening 94 is formed. An interface lip 95, that protrudes radially outwardly from valve conduit 88, is disposed about the interface opening. Valve opening 92 is formed coaxially with valve conduit 88, but has a smaller diameter than the diameter of valve conduit 88. Valve opening 92 communicates valve conduit 88 with an enclosure 96 formed by enclosure members 98 and enclosure openings 100. Enclosure 96 extends in a direction that is generally coaxial with valve conduit 88, but has a slight arc.

A sealing member 102 is disposed within enclosure 96. Sealing member 102 is retained within enclosure 96 by enclosure members 98 and valve conduit 88. In other words, sealing member 102 is large enough that it cannot escape from enclosure 96 via enclosure openings 100. In one embodiment, valve body 86 is formed as a single, integral body composed of a substantially rigid material, such as a plastic or composite material, or another rigid material. In another embodiment, valve body 86 is formed from a plurality of components joined together to form valve body 86. In one embodiment, sealing member 102 is a sphere to enable sealing member 102 to slide easily along enclosure 96. However, in other embodiments, sealing member 102 may be shaped differently. In one embodiment, sealing member 102 is formed from a hard, relatively heavy material, such as a steel or a brass. In one embodiment of the invention, sealing member 102 is coated with a compliant material, such as a silicon or another compliant material.

The present invention also contemplates that enclosure 96 can have other configurations, shapes, and orientations depending on the track to be followed by the sealing member as the flow monitoring system is tilted. For example, enclosure 96 can be straight. Sealing member should also have enough mass to move it to the desired position depending on the orientation of the flow sensor. For example, the seal member should weigh enough so that it moves into the sealed configuration with easy when the flow sensor is tilted. The present invention also contemplates providing a biasing mechanism, such as a spring or magnet that acts on the sealing member to urge it to one position or another.

In addition, the present invention contemplates that valve conduit 88, including enclosure 96, can be omitted entirely, so that the sealing element is disposed in the cavity or opening 100 defined by first valve chamber 24. Of course, the sealing member and/or the other components of the valve may have to be modified to allow the sealing member to move into an out of position to seal opening 44.

As can be seen in FIG. 1, flow monitoring system 10 also includes a second valve 104 substantially similar if not identical to first valve 84. More specifically, second valve 104 includes a valve body 106, a valve conduit 108, an interface opening, a valve opening 110, a conduit opening 112, an interface lip 114, an enclosure 116, enclosure members 118, enclosure openings 120, and a sealing member 122 that correspond to valve body 86, valve conduit 88, the interface opening, valve opening 92, conduit opening 94, interface lip 95, enclosure 96, enclosure members 98, enclosure openings 100, and sealing member 102 of first valve 84, respectively.

In the embodiment shown in FIG. 1, flow conduit 22 forms flow path 14 from flow inlet 18 to flow outlet 20. Annular housing 28 is disposed around flow conduit 22, and includes first annular housing portion 30, second annular housing portion 32, and third annular housing portion 34.

Annular housing 28 is formed coaxially with flow conduit 22, but has a larger diameter than does flow conduit 22. To function as a flow sensor, flow conduit includes a flow element or restriction (not shown) so that a differential pressure or pressure drop is created across the flow element. This differential pressure causes flow to divert through flow sensor 12 so that the diverted flow can be measured to determine the flow rate in flow path 14. In other flow sensors, the pressure on each side of the flow element is monitored to determine the flow in flow path. 14. The present invention contemplates that any conventional arrangement can be used for conduit 22 and the flow element. An example of one such configuration suitable for use in the present invention is disclosed in U.S. Pat. No. 6,915,705, the contents of which are incorporated herein by reference.

First valve chamber 24, formed as a hollow protrusion, extends from first annular housing portion 30, with a chamber opening (not shown in FIG. 1; see chamber opening 124 in FIG. 2) disposed at the distal end of first valve chamber 24. Second valve chamber 26, formed as a hollow protrusion, extends from third annular housing portion 34 to form a chamber opening (not shown in FIG. 1; see chamber opening 126 in FIG. 3) disposed at its distal end. The axis of first valve chamber 24 is parallel to the axis of second valve chamber 26. A board engaging member 128 extends from flow element 16 and has a board engaging opening 130 for receiving the circuit board 36. Specifically the circuit board 36 has a notch 132 and a protrusion 134. The protrusion 134 fits into opening 130, as the engaging member 128 fits into notch 132.

Figure 2:
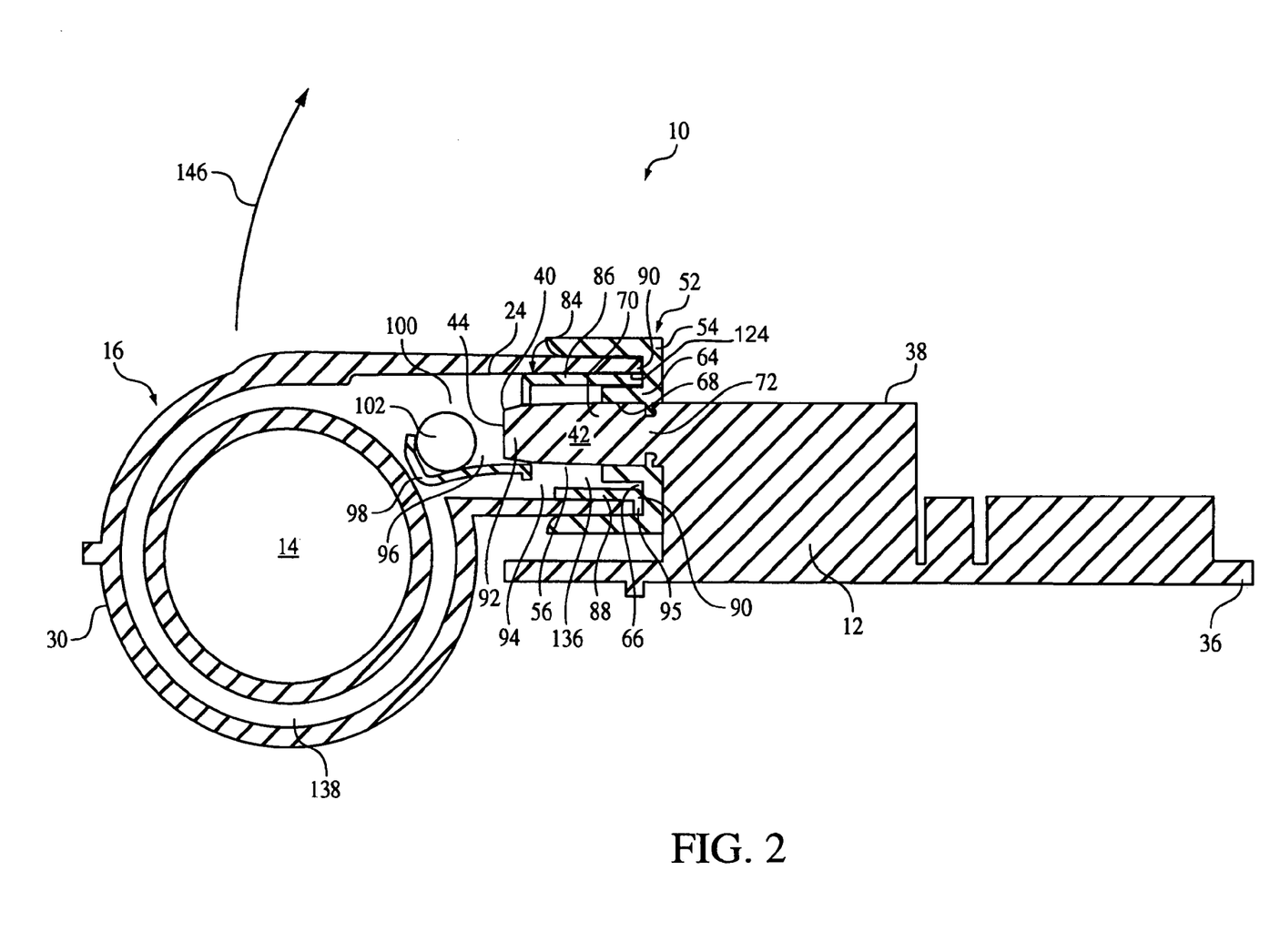
FIG. 2 is a sectional view, taken along section lines 2-2 shown in FIG. 1, of the flow monitoring system, in accordance with one embodiment of the invention.

FIG. 2 is a sectional view, taken along section lines 2-2 shown in FIG. 1, of flow monitoring system 10 assembled. As can be seen in FIG. 2, adaptor member 52 is provided on flow sensor housing 38. More specifically, adaptor member 52 receives hollow protrusion 42 of flow sensor inlet 40 through opening 72 into hollow protrusion 64 such that hollow protrusion 42 of flow sensor inlet extends through hollow protrusion 64 of adaptor member 52 through opening 70. The distal end of first valve chamber 24 of flow element 16 is received into first cup 54 of adaptor member 52 such that the chamber opening formed at the distal end of first valve chamber 24 (illustrated in FIG. 2 as chamber opening 124) is positioned within groove 66 formed by first cup 52 and hollow protrusion 64.

First valve 84 is disposed in first valve chamber 24 by providing valve conduit 88 about hollow protrusion 42 of flow sensor inlet 40 such that hollow protrusion 42 passes through the interface opening formed in valve conduit 88 (illustrated in FIG. 2 as interface opening 90) and valve opening 92. Since opening 44 associated with flow sensor inlet is located within enclosure 96, in order for any gas to reach opening 44, the gas must pass through enclosure openings 100 and enclosure 96. Between valve conduit 88 and hollow protrusion 42, a well 136 is formed. Well 136 communicates with first valve chamber 24 via conduit opening 94. As is shown in FIG. 2, a generally annular sensor inlet passage 138 that communicates with first valve chamber 24 is formed between flow conduit 22 and first annular housing portion 30 of annular housing 28.

Figure 3:
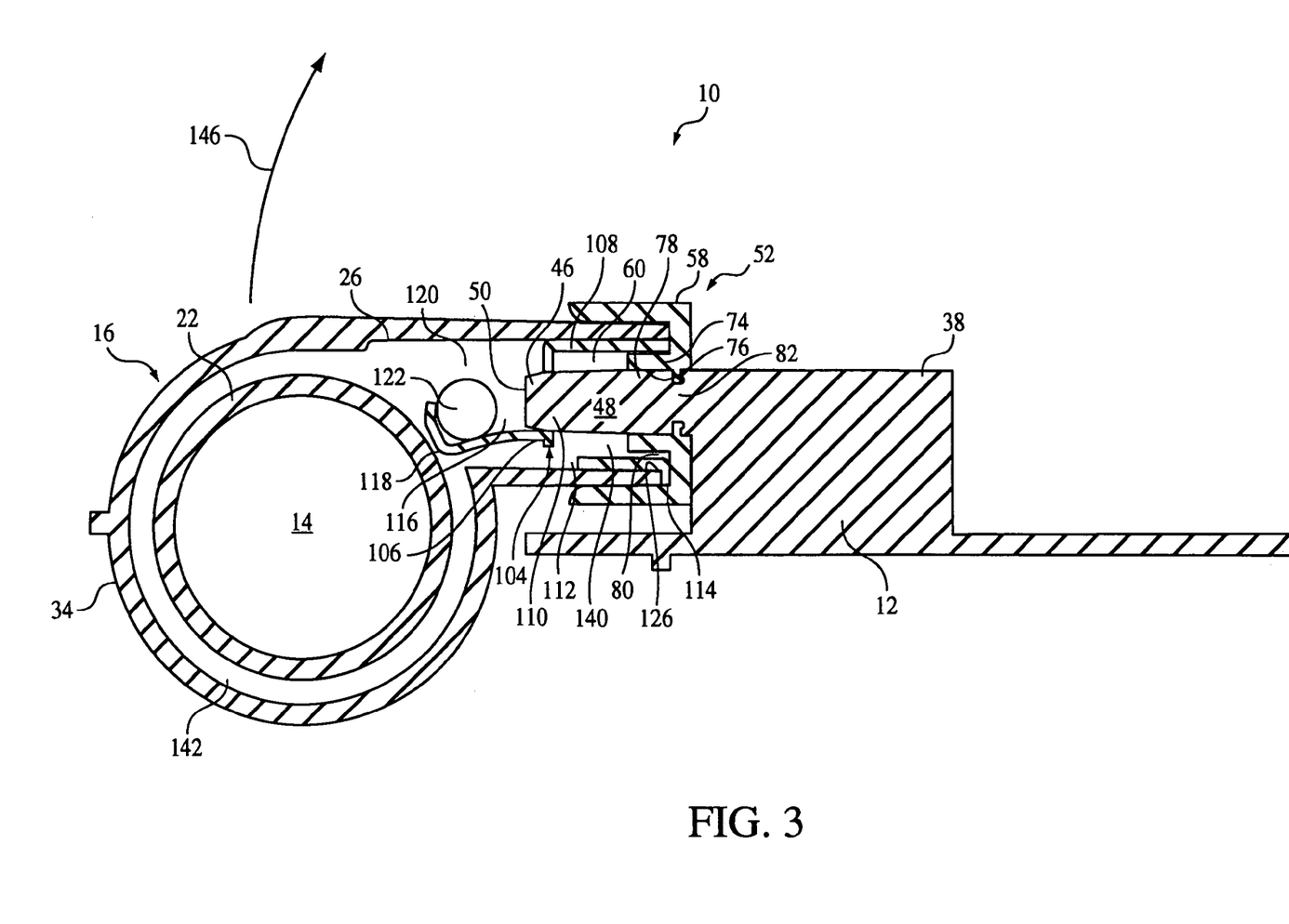
FIG. 3 is a sectional view, taken along section lines 3-3 shown in FIG. 1, of the flow monitoring system, according to one embodiment of the invention.

FIG. 3 is a sectional view, taken along section lines 3-3 shown in FIG. 1, of flow monitoring system 10 assembled. As can be seen in FIG. 3, flow sensor outlet 46, second cup 58 of adaptor member 52, second valve 104, and second valve chamber 26, and their various components, are assembled in a manner substantially identical to the assembly of flow sensor inlet 40, adaptor member 52, first valve 64, and first valve chamber 24, and their components. Similar to the assembly shown in FIG. 2, a well 140 is formed between valve conduit 108 and hollow protrusion 48 of sensor outlet 46. Well 140 communicates with valve chamber 26 via conduit opening 112. As is shown in FIG. 3, a generally annular sensor outlet passage 142 that communicates with second valve chamber 26 is formed between flow conduit 22 and third annular housing portion 34 of annular housing 28.

Figure 4:
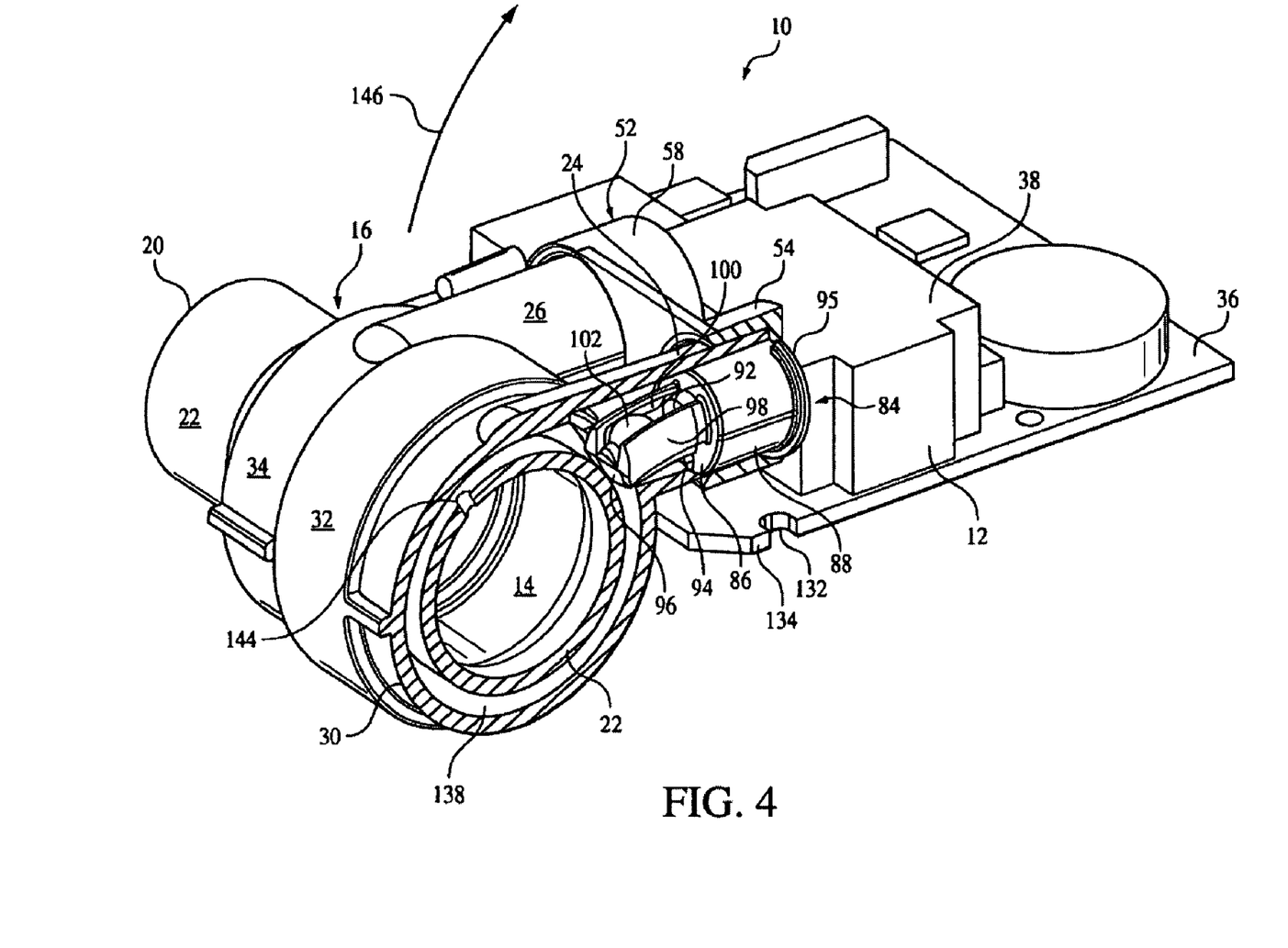
FIG. 4 is a perspective view of the flow monitoring system with a portion of a flow element included in the flow monitoring system removed along section lines 2-2, in accordance with one embodiment of the invention.

FIG. 4 shows flow monitoring system 10 assembled, with a section of flow member 16 removed along section lines 2-2 shown in FIG. 1. As can be seen in FIG. 4, a passage opening 144 is formed in flow conduit 22 that enables flow path 14 to communicate with sensor inlet passage 138. Although not shown in the drawings, a similar passage opening is formed in flow conduit 22 to enable flow path 14 to communicate with sensor outlet passage 142.

In one embodiment of the invention, gas is received at flow inlet 18 (not shown in FIG. 4; see FIG. 1) and is provided along flow path 14 by flow conduit 22 to flow outlet 20. Within flow conduit 22, a portion of the gas is diverted into sensor inlet passage 138 via passage opening 144. As can be appreciated from FIGS. 1 and 4, the diverted gas travels from sensor inlet passage 138, through first valve 84, to enclosure 96 associated with first valve 84, where the diverted gas is received into flow sensor housing 38 via opening 44 formed at flow sensor inlet 40. The diverted gas is then transmitted within flow sensor 12 from flow sensor inlet 40 to flow sensor outlet 46. Based on the flow rate of the diverted gas through flow sensor 12, flow sensor 12 generates a signal. At flow sensor outlet 46, the diverted gas is released from flow sensor housing 38 via opening 50 into enclosure 116 associated with second valve 104. From enclosure 116, the diverted gas flows into sensor outlet passage 142 by way of second valve chamber 26. The diverted gas then rejoins the gas flowing through flow conduit 22 via the passage opening between in flow conduit between flow path 14 and sensor outlet passage 142.

In one embodiment, the signal generated by flow sensor 12, based on the flow rate of the diverted gas through flow sensor 12, is used to determine the flow rate of the gas that is flowing directly through flow conduit 22 along flow path 14. Because valves 84 and 104 are positioned outside of flow path 14, valves 84 and 104 can open and close on inlet 40 and outlet 46 without impeding the flow of gas through flow path 14 formed by flow conduit 22. Further, the location of valves 84 and 104 may avoid any restriction of flow along flow path 14 that might be associated with placing a valve within flow path 14, even when the valve is open.

Additionally, it should be appreciated that although sensor 12 is shown and described as a flow sensor having an inlet and an outlet. The present invention contemplates that flow can also be measured by measuring the pressure differential across the flow element without having to have a flow of gas pass through flow sensor 12. Instead, the pressure at each side a flow restriction (not shown) in the flow elements is measured, either relative to one another or relative to a reference, such as the ambient pressure, and this pressure drop is used to measure the flow through flow path 14. In this embodiment, outlet 46 is not an outlet in that gas does not flow from outlet 46 into flow path 14. Rather, outlet 46 communicates gas from flow path 14 to the pressure measuring device, such as a flexible diaphragm, in the flow sensor. In another embodiment of the invention, sensor 12 is a sensor other than a flow sensor, such as, for example, a pressure sensor, and may only include an inlet. In one such embodiment, a valve is installed at the inlet of the pressure sensor, and gas is communicated from flow conduit 22 to the inlet by annular housing 28 in a manner similar to the one shown in FIGS. 2-4. The present invention contemplates that other sensing elements may be provided in housing 38 other than, or in addition to, a flow sensor. For example, a temperature sensor or humidity sensor can be provided so long as they are in communication with the gas in the flow path via a valve.

In one embodiment of the invention, first valve 84 and second valve 104 open and close based on an orientation of flow monitoring system 10. For example, in the embodiment illustrated in FIG. 4, when the general orientation of flow monitoring system 10 is substantially horizontal (as it illustrated in FIG. 4), valves 84 and 104 remain open. At this orientation, valves 84 and 104 remain open because enclosures 96 and 116 are shaped with a slight arc that causes sealing members 102 and 122 to remain away from openings 44 and 50 due to gravity. However, if flow monitoring system 10 is tilted so that flow member 16 becomes somewhat higher than flow sensor 12 (e.g., flow monitoring system is tilted along arrow 146), gravity causes sealing members 102 and 122 to become positioned over openings 44 and 50, effectively sealing flow sensor inlet 40 and outlet 46. Additionally, referring back to FIGS. 2 and 3, when flow monitoring system 10 is tilted along arrow 146, and liquid is introduced into valve chambers 24 and 26, the liquid will pool beneath openings 44 and 50 within wells 136 and 140.

In one embodiment, this may be useful when flow monitoring system 10 is connected with a supply of liquid that flows back into flow element 16 when a device that contains flow element 16 and/or the supply of liquid is tilted. For example, in one embodiment, flow monitoring system 10 is implemented in a pressure support system that includes a supply of liquid for use in a humidifier downstream from flow monitoring system 10. In this embodiment, when the pressure support system is accidentally tipped, and liquid stored in the humidifier flows into flow element 16, valves 84 and 104 effectively seal flow sensor 12 from the liquid.

Figure 5:
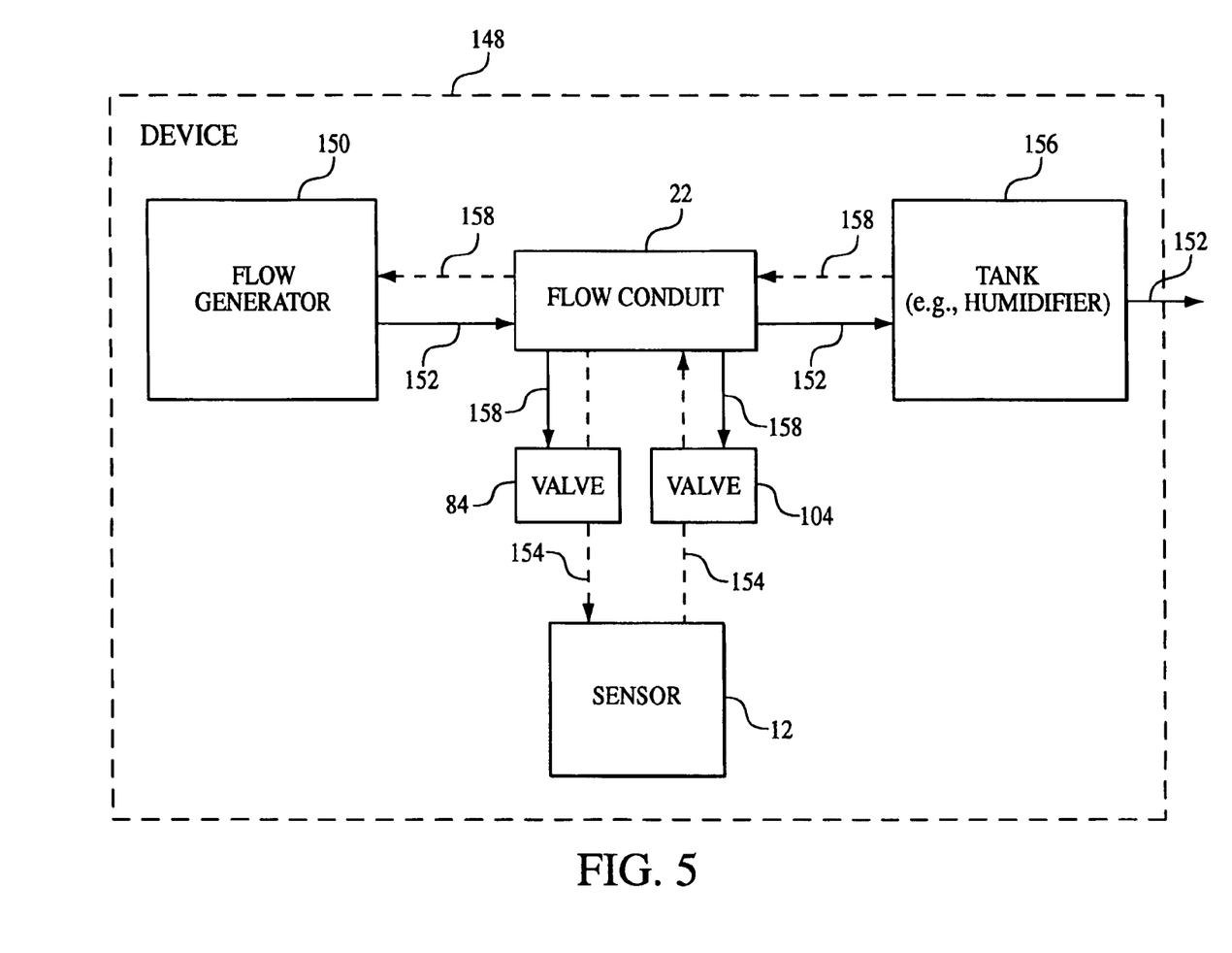
FIG. 5 is a schematic representation of a device implementing the flow monitoring system, according to one embodiment of the invention.

FIG. 5 is a schematic representation of flow monitoring system 10 disposed within a pressure support system 148, according to one embodiment of the invention. Pressure support system 148 is any device, including a ventilator or anesthesia device, that is capable of delivering a flow of gas or pressurized gas to the airway of a patient, either alone or with a humidification system. In the embodiment shown in FIG. 5, a flow generator 150 provides a pressurized flow of breathable gas 152 to flow conduit 22. In one embodiment, flow generator 150 is a blower, piston, bellows, compressor, or pump, that elevates the pressure of gas drawn into pressure support system 148 from ambient atmosphere. In another embodiment, the gas may be introduced into pressure support system 148 from an external gas source (not shown). For example, the gas may be introduced into pressure support system 148 under pressure from a pressurized canister of gas. In this embodiment, the gas source may function as a supply of gas, and as flow generator 150 located external to pressure support system 148.

A portion 154 of the gas provided to flow conduit 22 is diverted to sensor 12, and in some instances (e.g., sensor 12 comprises a flow sensor) the portion 154 of gas is returned to flow conduit 22. In other instances, however, (e.g., sensor 12 comprises a pressure sensor) the portion 154 of gas is not returned. From flow conduit 22 the pressurized flow of breathable gas 152 is provided to a tank or water chamber 156 that holds a reservoir of liquid. In one embodiment, tank 156 is a component of a humidifier system that elevates the temperature of the reservoir of liquid so as to elevate the humidity level of the pressurized flow of breathable gas 152 before the gas 152 is outlet from device 148. In this embodiment, when device 148 is accidentally tipped, and liquid 158 stored in tank 156 flows into flow element 16, valves 84 and 104 effectively seal sensor 12 from the liquid 158.

It should be appreciated that although valves 84 and 104 are illustrated in the drawings and described above as ball valves that use a sealing member that is slidably contained within an enclosure, other types of valves may be implemented within the scope of the invention. For example, in an alternate embodiment, valves 84 and 104 include hinged flapper valves that open and close to selectively seal flow sensor 12 based on the orientation of flow monitoring system 10. In another embodiment, flow monitoring system 10 may include a sensor that detects the orientation of system 10 or of a device in which system 10 is disposed, such as an inclinometer, and valves 84 and 104 may be electronically actuatable to open and close based on sensor 12. In another embodiment, flow monitoring system 10 may include a sensor that detects a presence of liquid within flow element 16, and valves 84 and 104 may be electronically actuatable to open and close based on the sensor.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A gas monitoring system comprising:
    a sensor disposed within a sensor housing, the sensor housing having an inlet and an outlet, the sensor generating a signal based on a characteristic of a gas within the housing;
    a first valve disposed at the inlet; and
    a second valve disposed at the outlet, wherein the first valve and the second valve open and close based on an orientation of the sensor housing.

2. The gas monitoring system of claim 1, wherein the first valve and the second valve open and close independent from one another.

3. The gas monitoring system of claim 1, wherein when the first valve closes the inlet is substantially sealed, and when the second valve closes the outlet is substantially sealed.

4. The gas monitoring system of claim 1, wherein when the first valve, the second valve, or both comprises a hinged flapper valve.

5. The gas monitoring system of claim 1, wherein the first valve comprises a chamber that contains the inlet and a sealing member that is movable within the chamber to substantially seal the inlet.

6. The gas monitoring system of claim 1, wherein the second valve comprises a chamber that contains the outlet and a sealing member that is movable within the chamber to substantially seal the outlet.

7. The gas monitoring system of claim 1, wherein the sensor is a flow sensor and the characteristic of the gas is a rate of flow of gas within the housing from the inlet to the outlet.

8. A gas monitoring system comprising:
a conduit constructed and arranged to conduct a flow of gas therethrough;
a sensor disposed within a sensor housing, the housing having an inlet and an outlet, the sensor generating a signal based on a characteristic of the gas within the sensor housing;
a first passage that communicates the conduit with the inlet such that a portion of the gas flowing through the conduit is communicated to the sensor;
a second passage that communicates the conduit with the outlet such that the gas received by the sensor is returned to the conduit by the second passage;
a first valve disposed at the inlet; and
a second valve disposed at the outlet, wherein the first valve selectively seals the inlet from the first passage and the second valve selectively seals the outlet valve from the second passage to inhibit liquid from reaching the sensor, and wherein the first valve and the second valve are actuated based on an orientation of the sensor.

9. The gas monitoring system of claim 8, wherein the first valve, the second valve, or both include a hinged flapper valve.

10. The gas monitoring system of claim 8, wherein the first valve comprises a sealing member located within the first passage that selectively seals the inlet from the conduit.

11. The gas monitoring system of claim 8, wherein the second valve comprises a sealing member located within the second passage that selectively seals the outlet from the conduit.

12. The gas monitoring system of claim 8, wherein the first valve selectively seals the inlet and the second valve selectively seals the outlet based on the orientation of the gas monitoring system.

13. The gas monitoring system of claim 8, wherein the first valve selectively seals the inlet and the second valve selectively seals the outlet based on a detection of liquid.

14. The gas monitoring system of claim 13, wherein the detection of liquid includes a detection of liquid at the inlet and/or the outlet.

15. The gas monitoring system of claim 13, wherein the detection of liquid includes a detection of liquid within the conduit.

16. The gas monitoring system of claim 13, wherein the sensor includes a flow sensor and the characteristic of the gas includes a flow rate of the gas.

17. A device comprising:
a tank that holds a reservoir of liquid;
a sensor provided within a sensor housing, the sensor housing having an inlet, the sensor generating a signal based on a characteristic of a gas within the sensor housing; and
an inlet valve disposed at the inlet, wherein when the device is tilted such that liquid from the reservoir of the liquid held by the tank travels toward the inlet of the sensor housing, the inlet valve closes to substantially prevent the liquid from reaching the sensor.

18. The device of claim 17, wherein the sensor housing further comprises an outlet, and the characteristic of the gas within the sensor housing is a flow rate from the inlet to the outlet.

19. The device of claim 18, further comprising an outlet valve that closes when liquid from the reservoir of liquid travels towards the outlet.

20. The device of claim 17, wherein the sensor includes a flow sensor that generates the signal based on a flow rate of the gas within the sensor housing.

21. The device of claim 17, wherein the sensor comprises a pressure sensor and the characteristic of the gas comprises a pressure of the gas.

22. A gas monitoring system, comprising:
a conduit constructed and arranged to conduct gas therethrough, the conduit adapted to be in communication with a liquid reservoir for adding humidity to the gas;
a chamber disposed exteriorly to the conduit, wherein a wall that separates the chamber from the conduit comprises an orifice that communicates a portion of the gas in the conduit to the chamber;
a sensor in communication with the chamber to determine at least one characteristic of the gas; and
a valve disposed between the orifice and the sensor to inhibit the liquid from reaching the sensor, wherein the valve opens and closes based on an orientation of the conduit.

23. The gas monitoring system of claim 22, wherein the orifice is position towards an upper portion of the chamber.

24. The gas monitoring system of claim 22, wherein the sensor is a flow sensor that determines a flow rate or a pressure sensor that monitors a pressure.

25. The gas monitoring system of claim 22, wherein the chamber is disposed in communication with an inlet and an outlet to the sensor, and wherein the valve is disposed in the inlet.

26. The gas monitoring system of claim 25, further comprising a second valve that is disposed at the outlet.

* * * * *